United States Patent
Sarac et al.

(10) Patent No.: US 10,781,277 B2
(45) Date of Patent: Sep. 22, 2020

(54) METHOD OF FORMING A COMPOSITE NANOPARTICLE FOR NANOFIBERS FROM A POLY-(ACRYLONITRILE-CO-ITACONIC ACID) POLY 3-METHOXYTHIPOHENE (P(AN-CO-IA)-PMOT) NANO COMPOSITE SOLUTION

(71) Applicant: Istanbul Technical University, Maslak, Istanbul (TR)

(72) Inventors: Abdulkadir Sezai Sarac, Istanbul (TR); Havva Baskan, Istanbul (TR); Hale Karakas, Istanbul (TR)

(73) Assignee: ISTANBUL TECHNICAL UNIVERSITY, Istanbul (TR)

( * ) Notice: Subject to any disclaimer, the term of this patent is extended or adjusted under 35 U.S.C. 154(b) by 135 days.

(21) Appl. No.: 15/910,596

(22) Filed: Mar. 2, 2018

(65) Prior Publication Data

US 2018/0258210 A1  Sep. 13, 2018

(30) Foreign Application Priority Data

Mar. 8, 2017 (TR) .................. 2017 03562

(51) Int. Cl.

| | | |
|---|---|---|
| *C08F 220/44* | (2006.01) | |
| *C08F 220/46* | (2006.01) | |
| *C08F 222/02* | (2006.01) | |
| *C08F 267/02* | (2006.01) | |
| *C08F 267/08* | (2006.01) | |
| *C08G 61/12* | (2006.01) | |
| *C08F 228/06* | (2006.01) | |

(Continued)

(52) U.S. Cl.
CPC ............. *C08F 267/08* (2013.01); *C08F 2/22* (2013.01); *C08F 2/26* (2013.01); *C08F 6/06* (2013.01); *C08F 220/44* (2013.01); *C08F 220/46* (2013.01); *C08F 228/06* (2013.01); *C08G 61/126* (2013.01); *D01D 5/003* (2013.01); *D01D 5/28* (2013.01); *D01F 6/54* (2013.01); *B82Y 40/00* (2013.01); *C08F 222/02* (2013.01); *C08F 267/02* (2013.01); *C08F 2500/24* (2013.01); *C08G 2261/1424* (2013.01); *C08G 2261/3223* (2013.01); *D01F 6/38* (2013.01)

(58) Field of Classification Search
CPC ..... C08G 61/126; C08F 267/02; C08F 267/08
See application file for complete search history.

(56) References Cited

U.S. PATENT DOCUMENTS

2013/0149532 A1  6/2013  Yun

FOREIGN PATENT DOCUMENTS

| KR | 20040040692 A | 5/2004 |
|---|---|---|
| KR | 20110074282 A | 6/2011 |

(Continued)

OTHER PUBLICATIONS

Baskan, H. et al., "Poly(acrylonitrile-co-itaconic acid)-poly(3,4-ethylenedioxythiophene) and poly(3-methoxythiophene) nanoparticles and nanofibres". Bulletin of Materials Science 2017, 40(5), 957-969. (Year: 2017).*

Primary Examiner — Richard A Huhn
(74) Attorney, Agent, or Firm — Craft Chu PLLC; Andrew W. Chu

(57) ABSTRACT

The nano-fibre derivative method includes polymerization of 3-methoxthiophene (MOT) monomer on Poly(acrylonitrile co-itaconic acid) matrix and by use of electro-spinning of the produced nano-particulate.

16 Claims, 4 Drawing Sheets

(51) Int. Cl.
  *C08F 2/22* (2006.01)
  *D01D 5/00* (2006.01)
  *D01D 5/28* (2006.01)
  *C08F 6/06* (2006.01)
  *D01F 6/54* (2006.01)
  *C08F 2/26* (2006.01)
  *B82Y 40/00* (2011.01)
  *D01F 6/38* (2006.01)

(56) References Cited

FOREIGN PATENT DOCUMENTS

KR  20120094807 A   8/2012
KR   101447078 B1  10/2014

* cited by examiner

METHOD OF FORMING A COMPOSITE NANOPARTICLE FOR NANOFIBERS FROM A POLY-(ACRYLONITRILE-CO-ITACONIC ACID) POLY 3-METHOXYTHIPOHENE (P(AN-CO-IA)-PMOT) NANO COMPOSITE SOLUTION

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a method for forming a composite nanoparticle by coating 3-methoxythiophene (MOT) monomer on a poly(acrylonitrile co-itaconic acid) (P(AN-co-IA)) matrix to form a P(AN-co-IA)-PMOT nano composite solution and electro-spinning a produced nano-particulate from the P(AN-co-IA)-PMOT nano composite solution.

2. Description of Related Art Including Information Disclosed Under 37 CFR 1.97 and 37 CFR 1.98.

Since conductive polymers have a broad area of use in super capacitor and electro chromatic instruments, conductive polymers have been studied comprehensively since 1970s.

In academic literature, studies were conducted on electro-chemical polymerization of a 3-methoxythiophene monomer of conductive monomers. The electro-chemical polymerization was made only in organic solvents, such as acetonitrile and propylene carbonate, for many years because the 3-methoxythiophene monomer has low solubility in water.

Non-polymerization of 3-methoxythiophene monomer in wet micelle medium is a big disadvantage. As learned over time, water solubility of thiophene derivatives in water was increased by adding surface active agents (sodium dodecyl sulfate (SDS)), and potentials to start oxidization were reduced. Thus, electro polymerization of 3-methoxythiophene monomer in water medium could be realized.

Due to low water solubility of the 3-methoxythiophene monomer and having an oxidization potential higher than water, electro polymerization of the 3-methoxythiophene monomer could not be realized.

Organic solvent mediums, such as acetonitrile and propylene carbonate were used for synthesizing poly(3-methoxythiophene) (PMOT) polymers for many years. Not being capable to work with the 3-methoxythiophene monomer in a water medium without—adding another chemical was a disadvantage in economics and ecological terms.

There is no study concerning nano-fiber production by use of the electro-spinning method due to the difficulty with polymerization of a 3-methoxythiophene monomer and processing the 3-methoxythiophene monomer. This difficulty led to restriction in the area of using nano-fibers, which have conductivity features.

In the prior art, Korean Patent application number KR101447078 discloses a study on production of polyacrylonitrile (PAN) based on carbon fiber, which has a high electro conductivity and a considerably robust structure. In KR101447078, a monomer mixture consisting of acrylonitrile, methyl acrylate and itaconic acid monomer is used, and polymerization is initiated by adding an azobisisobutyronitrile starter. It is understood that the polymerization method used under this study is not emulsion polymerization, and particularly, use of azobisisobutyronitrile is clearly taught.

In another prior art reference, Korean Patent application number KR20040040692 aims to provide ultramicro nano fiber production by use of both thermoplastic resin and thermoset resin. An electro-blown method is used in this nano-fiber production. In this method, the solvent, prepared by dissolving polymer in a solution in advance, is fed to a spinning cap. Then, high voltage and compressed air are applied underneath the spinning cap. Collection of nano fibers at a collector is provided by a blowing means.

In still another prior art reference, Korean Patent application number KR20110074282 provides production of polyvinyl alcohol nano fibers by means of an electrospinning method with an added metallic ion effect of the nano fibers by a submersion method. The method forms polypyrrole-poly(3,4-ethylenedioxythiophene) PPy-PEDOT nano tube members in polyvinyl nano fibers by a vapor deposition polymerization method. This embodiment has magnetic characteristics and is used in heavy metal filtering processes.

In yet another prior art reference, Korean patent application number KR20120094807 discloses a method for production of nano-fibers consisting of a polymer containing phase changing material and having super absorption in order to enhance strength against load pressure. In this method, first, a nanocapsule consisting of phase changing material is formed. Then, a nanofiber production is made from the nanocapsule provided by an electrospinning method. Polymers with the super absorbing feature are covered onto produced nanofibers by a spray covering method. Lastly, the thermal and ultraviolet studies of the covered nanofiber were conducted.

Another prior art reference is US Patent Publication No. US2013149532A1. Two different monomer solutions are supplied to different injectors, and then polymeric fiber comes from one single nozzle. In this method, no polymerization process is applied to monomers before the process of preparing the solution. After solutions are supplied in monomer form, the fiber formation is provided in a manner conforming to inter-polymerized polymeric fiber form, according to interfacial polymerization and being obtained from a single polymer.

The prior art does not include production of nanofibers from a nano composite solution of poly(acrylonitrile-co-itaconic acid)-poly(3-methoxythiophene) (P(AN-co-IA)-PMOT) from coating a 3-methoxythiophene monomer on a poly(acrylonitrile-co-itaconic acid) polymer in a water medium.

For the above mentioned reasons, a nanofiber component production method has been needed.

BRIEF SUMMARY OF THE INVENTION

From this status of the related art, the purpose of the invention is to disclose a method of forming a composite nanoparticle for nanofibers so as to eliminate the current disadvantages.

Another purpose of the invention is to disclose a method facilitating a 3-methoxythiophene (MOT) monomer capability to be processed and developing use of the 3-methoxythiophene (MOT).

A further purpose of the invention is to disclose a—method stabilizing loaded particles, such as anion radicals and cation radicals, so as to use a micelle medium.

Another purpose of the invention is to disclose a method of forming a composite nanoparticle for nanofibers from a P(AN-co-IA)-PMOT nano composite solution by electrospinning.

A further purpose of the invention is to disclose a nanofiber from the composite nanoparticle of the method with a capacitive feature so as to provide an advantage for applications requiring an electro-active feature.

Another purpose of the invention is to disclose a method for elimination of electrification by fractioning and covering produced nanofibers on a plastic material surface.

A further purpose of the invention is to disclose a method for providing a structure—with electrostatic or electromagnetic protection.

REFERENCE NUMBERS

Figure 1:
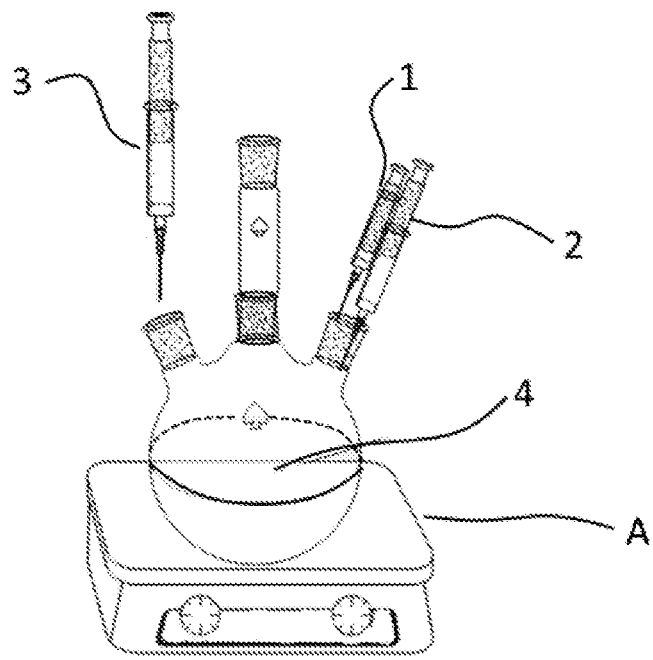
FIG. 1 is a schematic view of an illustration of emulsion polymerization according to the invention.

A Emulsion Polymerization Mechanism
1 an itaconic acid (IA) applicator
2 an acrylonitrile applicator
3 an ammonium persulfate (APS) applicator
4 a sodium dodecylbenzene sulfonate (SDBS) applicator
5 a polymer solvent applicator
6 a needle
7 a collector

DETAILED DESCRIPTION OF THE INVENTION

It should be noted in the following description that like or the same reference numerals in different embodiments denote the same or similar features. In this detailed description, novelty being subject of this invention has been disclosed solely for the purpose of better understanding of the subject and with samples described in a manner not causing any restrictive effect.

The invention is a method for forming a composite nanoparticle for nanofibers by coating 3-methoxythiophene (MOT) monomer on a poly(acrylonitrile-co-itaconic acid) (P(AN-co-IA)) matrix so as to form a P(AN-co-IA)-PMOT nano composite solution and electro-spinning a produced nano-particulate from the P(AN-co-IA)-PMOT nano composite solution.

A poly(acrylonitrile-co-itaconic acid) (P(AN-co-IA)) matrix is formed by emulsion polymerizing acrylonitrile (AN) and itaconic acid (IA) monomers in a water medium.

A poly(acrylonitrile-co-itaconic acid)-poly(3-methoxythiophene) (P(AN-co-IA)-PMOT) nano composite solution is obtained by covering or coating 3-methoxythiophene (MOT) monomer on the P(AN-co-IA) matrix by in-situ polymerization.

The P(AN-co-IA)-PMOT nano-composite solution is settled and dried so as to form a powder form.

The powder form is a poly(acrylonitrile-co-itaconic acid)-poly(3-methoxythiophene) polymer. The powder form is dissolved in N,N-dimethylformamide (DMF) at 5% by mass of the powder form so as to form a produced nano particulate.

The composite nanoparticle for nanofibers is formed by electrospinning the produced nano particulate.

FIG. 1 shows an illustrative view of the step of emulsion polymerizing, according to the present invention.

Figure 2:
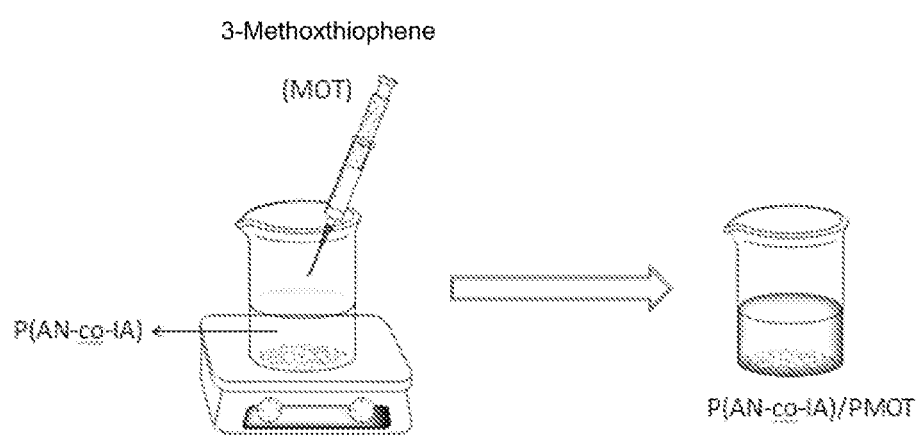
FIG. 2 is a schematic view of an illustration of synthesis of a P(AN-co-IA)-PMOT nano composite solution from coating 3-methoxythiophene (MOT) on a P(AN-co-IA) matrix by in-situ polymerization.

FIG. 2 indicates an illustrative view of synthesis of the P(AN-co-IA)-PMOT nano composite solution by coating 3-methoxythiophene (MOT) on the P(AN-co-IA) matrix by in-situ polymerization.

Figure 3:
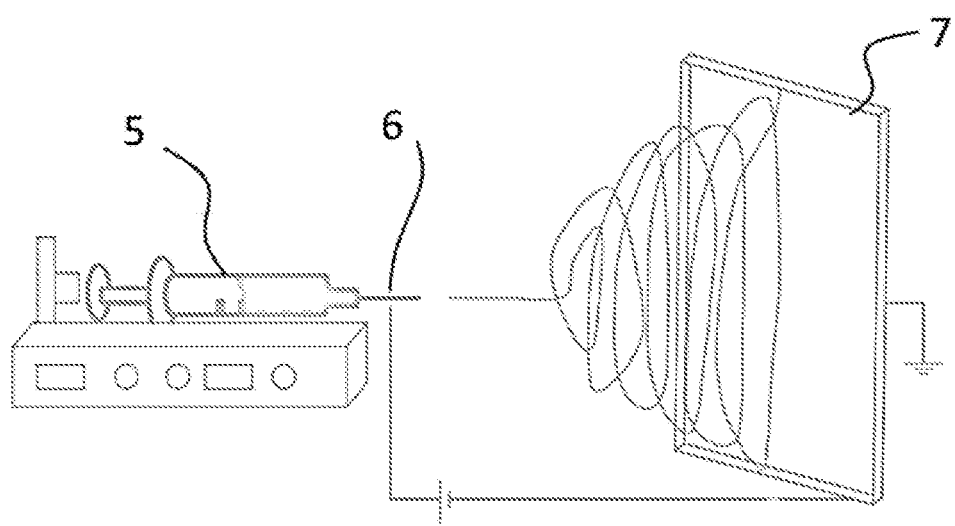
FIG. 3 is a schematic view of an illustration of electrospinning.

FIG. 3 shows an illustrative view of electrospinning.

In the present invention, the poly(acrylonitrile-co-itaconic acid) (P(AN-co-IA)) matrix is obtained by emulsion polymerizing acrylonitrile (AN) and itaconic acid (IA) monomers in a water medium.

Figure 4:
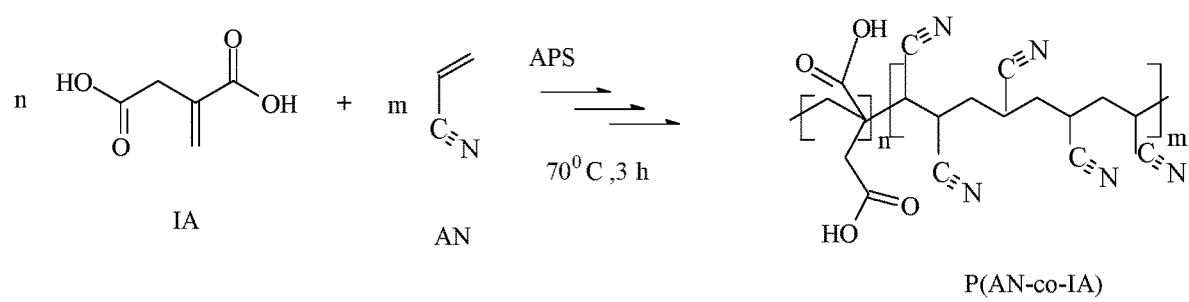
FIG. 4 is a schematic view of the formula, according to the present invention.
Figure 5:
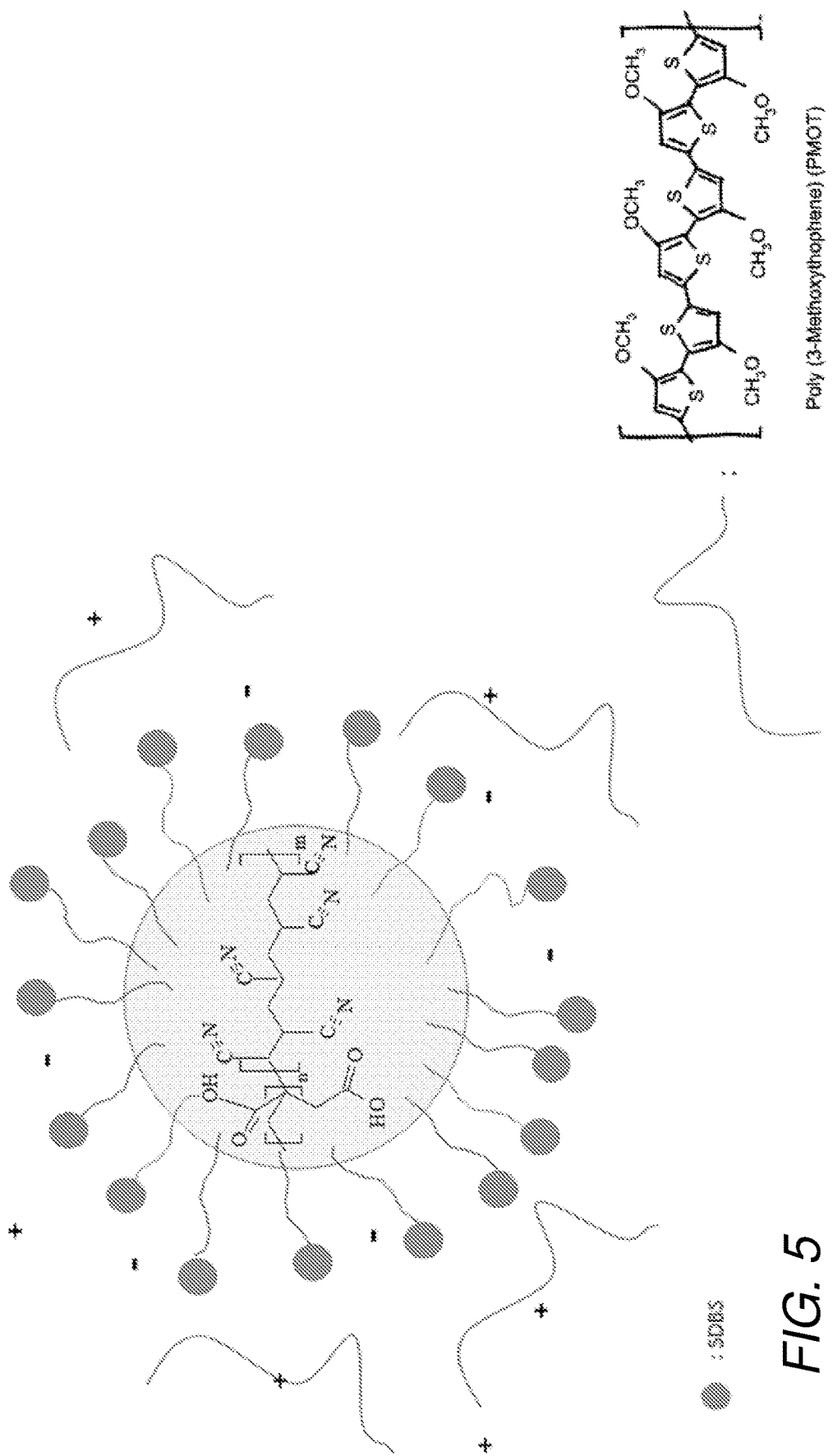
FIG. 5 is a schematic illustration of the formula, according to the present invention.

The formulas concerning components of the present invention are shown in FIG. 4 and FIG. 5.

Then, a P(AN-co-IA)-PMOT nano composite solution is obtained by covering or coating 3-methoxythiophene (MOT) monomer on the P(AN-co-IA) matrix by in-situ polymerization.

Then, the P(AN-co-IA)-PMOT nano composite solution is settled and dried into a powder form. In the next stage toward nanofiber production, the powder form is dissolved in N,N-dimethylformamide (DMF) at 5% by mass so as to form a produced nano particulate. The next step is electrospinning the produced nano particulate so as to form a composite nanoparticle, specifically (P(AN-co-IA)-PMOT composite nanoparticles, for nanofibers.

In the present invention, the step of emulsion polymerizing acrylonitrile (AN) and itaconic acid (IA) monomers so as to obtain the poly(acrylonitrile-co-itaconic acid) (P(AN-co-IA)) matrix includes the use of the emulsion polymerization mechanism (A) of FIG. 1. In this embodiment of mechanism (A), a 0.1% mol acrylonitrile (AN) solution and itaconic acid (IA) are used. The AN and IA are placed in the emulsion polymerization mechanism (A) container by use of an acrylonitrile applicator (2) and an itaconic acid applicator (1), respectively.

In one embodiment, the step of emulsion polymerizing acrylonitrile (AN) and itaconic acid (IA) monomers includes adding a surfactant active agent, such as sodium dodecylbenzene sulfonate (SDBS). In a particular embodiment, 1.0766 g SDBS is added, when 0.1301 g IA and 6.5 ml of a 0.1% mol AN solution are used in 150 ml water medium. The surfactant active agent, such as SDBS, can be located inside an SDBS applicator (4).

In some embodiments, the components, IA, AN, and SDBS, are each added respectively and mixed in a magnetic mixer for 30 minutes upon adding each component so as to form a mixed solution. Then, the temperature of the solution is raised to 70° C. so as to form a mixed and heated solution.

When the solution temperature is 70° C., the step of emulsion polymerizing acrylonitrile (AN) and itaconic acid (IA) monomers further comprises the step of adding ammonium persulfate (APS) as an initiator or starter to the mixed and heated solution so as to form an initiated solution. The APS can be added by an APS applicator (3). In a particular embodiment, 3.423 g APS is added, when 1.0766 g is added and when 0.1301 g IA and 6.5 ml of a 0.1% mol AN solution are used in the 150 ml water medium. The polymerization process is continued for the initiated solution at 70° C. for 3 hours so as to form the P(AN-co-IA) matrix. After 3 hours, the obtained P(AN-co-IA) matrix is a polymer latex.

The step of coating said P(AN-co-IA) matrix with 3-methoxythiophene (MOT) monomer includes fractioning. In one embodiment, the step of coating further comprises the step of: equally dividing the P(AN-co-IA) matrix into ten (10) beakers. In a particular embodiment, a first portion of 3-methoxythiophene is added and mixed with the P(AN-co-IA) matrix in a first beaker of the ten beakers; a second portion of 3-methoxythiophene is added and mixed with the P(AN-co-IA) matrix in a second beaker of the ten beakers; and a third portion of 3-methoxythiophene is added and mixed with the P(AN-co-IA) matrix in a third beaker of the ten beakers. The mixing in the first beaker, the second beaker, and the third beaker can be by magnetic mixer at room temperature for 72 hours so as to form a first polymerizing solution, a second polymerizing solution, and a third polymerizing solution, respectively. The first polymerizing solution, the second polymerizing solution, and the third polymerizing solution are combined to form the P(AN-co-IA)-PMOT nano composite solution. In more particular embodiments, when 3.423 g APS is added, when 1.0766 g is added and when 0.1301 g IA and 6.5 ml of a 0.1% mol AN solution are used in the 150 ml water medium, the first portion is 77.6 µl of 3-methoxythiophene, the second portion being 116.4 µl of 3-methoxythiophene, and the third portion being 155.2 µl of 3-methoxythiophene.

In embodiments of the method of the present invention, the step of settling and drying said P(AN-co-IA)-PMOT nano composite solution further comprises the steps of: settling produced nano-particulars with ethanol; flushing the produced nano-particulars with additional-ethanol; and flushing the produced nano-particulars with water. Then, the produced nano particulars are dried at 60° C. at vacuum drying oven to form the powder form.

In more particular embodiments, polymerization efficiencies are calculated as 70%, 74% and 76% respectively for 77.6 µl, 116.4 µl and 155.2 µl as the first portion, the second portion, and the third portion 3-methoxythiophene.

In the present invention, the step of dissolving includes mixing the powder form of the produced nano-particulars from the P(AN-co-IA)-PMOT nano composite solution) in N,N-dimethylformamide (DMF) from a DMF solution at 5% by mass so as to form a produced nano particulate. Furthermore, other solutions of polyacrylonitrile (PAN) can be prepared in DMF solutions at 5% by mass.

In this embodiment, the step of dissolving includes mixing powder form with said DMF solution by magnetic mixer at room temperature for 2 hours so as to form the produced nano particulate. The other solutions of polyacrylonitrile can also be mixed in respective DMF solutions.

The produced nano particulate is subjected to electrospinning by applying 15 kV voltage at a 1.0 ml/h supply rate through a polymer solution applicator (5). The distance between needle (6) and collector (7) can be 10 cm.

High electric current is applied to the produced nano particulate supplied from the polymer solution applicator (5) to needle (6) in the electrospinning method of the present invention so as to form the composite nanoparticle as a P(AN-co-IA)-PMOT composite nanoparticle. The composite nanoparticle is collected at a collector (7) at a certain distance and in a high electrical (DC) field by a pump.

In other embodiments, the step of electro-spinning the produced nano particulate can include electro-spinning concurrent with other solutions having forms of polyacrylonitrile (PAN). Thus, PAN-P(AN-co-IA)-PMOT nanofibers can be obtained with the P(AN-co-IA)-PMOT composite nanoparticle as a component of the nanofiber after electrospinning.

We claim:

1. A method, comprising the steps of:
   emulsion polymerizing acrylonitrile (AN) and itaconic acid (IA) monomers in a water medium so as to obtain a poly-(acrylonitrile-co-itaconic acid) (P(AN-co-IA)) matrix;
   coating said P(AN-co-IA) matrix with 3-methoxythiophene (MOT) monomer so as to form a P(AN-co-IA)-PMOT nano composite solution by in-situ polymerization;
   settling and drying said P(AN-co-IA)-PMOT nano composite solution so as to form a powder form;
   dissolving said powder form in a N,N-dimethylformamide (DMF) solution at 5% by mass so as to form a produced nano particulate; and
   electro-spinning said produced nano particulate so as to form a composite nanoparticle.

2. The method, according to claim 1, wherein the step of emulsion polymerizing acrylonitrile (AN) and itaconic acid (IA) monomers further comprises the steps of:
   placing said acrylonitrile (AN) in said water medium with an acrylonitrile applicator; and
   placing said itaconic acid in said water medium with an itaconic acid applicator.

3. The method, according to claim 2, wherein the step of emulsion polymerizing acrylonitrile (AN) and itaconic acid (IA) monomers further comprises the step of:
   adding sodium dodecylbenzene sulfonate (SDBS) as a surfactant agent to said water medium.

4. The method, according to claim 3, wherein the step of emulsion polymerizing acrylonitrile (AN) and itaconic acid (IA) monomers further comprises the step of:
   mixing said AN, said IA, and said SDBS in said water medium in a magnetic mixer for 30 minutes so as to form a mixed solution.

5. The method, according to claim 4, wherein the step of emulsion polymerizing acrylonitrile (AN) and itaconic acid (IA) monomers further comprises the step of:
   raising temperature of said mixed solution to 70° C. so as to form a mixed and heated solution.

6. The method, according to claim 5, wherein the step of emulsion polymerizing acrylonitrile (AN) and itaconic acid (IA) monomers further comprises the step of:

adding ammonium persulfate (APS) to said mixed and heated solution as initiator so as to form an initiated solution.

7. The method, according to claim 6, wherein the step of emulsion polymerizing acrylonitrile (AN) and itaconic acid (IA) monomers further comprises the step of:
polymerizing said initiated solution at 70° C. for 3 hours so as to form said P(AN-co-IA) matrix, said P(AN-co-IA) matrix being a polymer latex.

8. The method, according to claim 7, wherein the step of coating said P(AN-co-IA) matrix with 3-methoxythiophene (MOT) monomer further comprises the step of:
equally dividing said P(AN-co-IA) matrix into 10 beakers.

9. The method, according to claim 8, wherein the step of coating said P(AN-co-IA) matrix with 3-methoxythiophene (MOT) monomer further comprises the steps of:
adding a first portion of said 3-methoxythiophene monomer (MOT) to said P(AN-co-IA) matrix in a first beaker of said 10 beakers;
mixing said first portion with said P(AN-co-IA) matrix in said first beaker by magnetic mixer at room temperature for 72 hours so as to form a first polymerizing solution;
adding a second portion of said 3-methoxythiophene monomer (MOT) to said P(AN-co-IA) matrix in a second beaker of said 10 beakers;
mixing said second portion with said P(AN-co-IA) matrix in said second beaker by magnetic mixer at room temperature for 72 hours so as to form a second polymerizing solution;
adding a third portion of said 3-methoxythiophene monomer (MOT) to said P(AN-co-IA) matrix in a third beaker of said 10 beakers;
mixing said third portion with said P(AN-co-IA) matrix in said third beaker by magnetic mixer at room temperature for 72 hours so as to form a third polymerizing solution; and
combining said first polymerizing solution, said second polymerizing solution, and said third polymerizing solution so as to form said P(AN-co-IA)-PMOT nano composite solution.

10. The method, according to claim 9, wherein the step of settling and drying said P(AN-co-IA)-PMOT nano composite solution further comprises the steps of:
settling produced nano particulate from said P(AN-co-IA)-PMOT nano composite solution with ethanol;
flushing said produced nano particulate with additional ethanol;
flushing said produced nano particulate with water; and
drying said produced nano particulate at 60° C. in a vacuum drying oven so as to form said powder form.

11. The method, according to claim 10, wherein the step of dissolving said powder form further comprises the step of:
mixing said powder form and said DMF by magnetic mixer at room temperature for 2 hours so as to form said produced nano-particulate.

12. The method, according to claim 11, wherein the step of electro-spinning further comprises the step of: applying 15 kV voltage at a 1.0 mL/h supply rate through a polymer solution applicator so as to form said composite nanoparticle.

13. The method, according to claim 1, further comprising the steps of:
forming nanofibers with polyacrylonitrile (PAN) and said composite nanoparticle, said nanofibers being comprised of PAN-P(AN-co-IA)-PMOT nanofibers.

14. The method, according to claim 3, wherein the amount of said sodium dodecylbenzene sulfonate is 1.0766 g, wherein the amount of said itaconic acid is 0.1301 g, wherein the amount of said acrylonitrile is 6.5 mL, and wherein the amount of said water medium is 150 mL.

15. The method, according to claim 6, wherein the amount of said sodium dodecylbenzene sulfonate is 1.0766 g, wherein the amount of said itaconic acid is 0.1301 g, wherein the amount of said acrylonitrile is 6.5 mL, wherein the amount of said ammonium persulfate is 3.423 g, and wherein the amount of said water medium is 150 mL.

16. The method, according to claim 9, wherein the amount of said sodium dodecylbenzene sulfonate is 1.0766 g, wherein the amount of said itaconic acid is 0.1301 g, wherein the amount of said acrylonitrile is 6.5 mL, wherein the amount of said ammonium persulfate is 3.423 g, wherein the amount of said water medium is 150 mL, wherein said first portion of 3-methoxythiophene monomer (MOT) is 77.6 µL, wherein said second portion of 3-methoxythiophene monomer (MOT) is 116.4 µL, and wherein said third portion of 3-methoxythiophene monomer (MOT) is 155.2 µL.

* * * * *

UNITED STATES PATENT AND TRADEMARK OFFICE
CERTIFICATE OF CORRECTION

Page 1 of 1

PATENT NO. : 10,781,277 B2
APPLICATION NO. : 15/910596
DATED : September 22, 2020
INVENTOR(S) : Abdulkadir Sezai Saraç et al.

It is certified that error appears in the above-identified patent and that said Letters Patent is hereby corrected as shown below:

On the Title Page

In the Title and in the Specification, at Column 1, Line 4:
Replace "METHOXYTHIPOHENE" with "METHOXYTHIOPHENE".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*